United States Patent
Wu

(10) Patent No.: US 11,674,229 B2
(45) Date of Patent: Jun. 13, 2023

(54) ETCHING CHELATING AGENT, MANUFACTURING METHOD THEREOF, AND ETCHING SOLUTION COMPOSITION

(71) Applicant: SHENZHEN CHINA STAR OPTOELECTRONICS SEMICONDUCTOR DISPLAY TECHNOLOGY CO., LTD., Shenzhen (CN)

(72) Inventor: Haoxu Wu, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 401 days.

(21) Appl. No.: 16/954,218

(22) PCT Filed: May 7, 2020

(86) PCT No.: PCT/CN2020/088870
§ 371 (c)(1),
(2) Date: Jun. 16, 2020

(87) PCT Pub. No.: WO2021/189603
PCT Pub. Date: Sep. 30, 2021

(65) Prior Publication Data
US 2022/0127728 A1     Apr. 28, 2022

(30) Foreign Application Priority Data

Mar. 23, 2020   (CN) .................. 202010209957.2

(51) Int. Cl.
| C23F 1/18 | (2006.01) |
| C08K 5/17 | (2006.01) |
| C08L 1/28 | (2006.01) |
| C08L 25/06 | (2006.01) |
| C08B 11/12 | (2006.01) |
| C23F 1/34 | (2006.01) |

(52) U.S. Cl.
CPC ................ *C23F 1/18* (2013.01); *C08B 11/12* (2013.01); *C08K 5/17* (2013.01); *C08L 1/286* (2013.01); *C08L 25/06* (2013.01); *C23F 1/34* (2013.01); *C08L 2312/00* (2013.01)

(58) Field of Classification Search
CPC . C08B 11/12; C08K 5/17; C08L 1/286; C08L 25/06; C08L 2312/00; C23F 1/18; C23F 1/34
See application file for complete search history.

(56) References Cited

U.S. PATENT DOCUMENTS 5,965,036 A     10/1999   Maki et al.

FOREIGN PATENT DOCUMENTS

| CN | 105386056 A | 3/2016 |
| CN | 109112545 A | 1/2019 |
| EP | 0855454 A1 | 7/1998 |

OTHER PUBLICATIONS

Velempini et al., "Epichlorohydrin Crosslinked Carboxymethyl Cellulose-Ethylenediamine Imprinted Polymer for the Selective Uptake of Cr(VI)", International Journal of Biological Macromolecules, 101 (2017), pp. 837-844.*

* cited by examiner

*Primary Examiner* — Patrick D Niland
(74) *Attorney, Agent, or Firm* — PV IP PC; Wei Te Chung; Zhigang Ma

(57) ABSTRACT

The invention discloses an etching chelating agent, a manufacturing method thereof, and an etching solution composition. The etching chelating agent includes cellulose cross-linked polymer, and the cellulose cross-linked polymer is obtained by cross-linking and polymerizing carboxymethyl cellulose and an amine compound.

13 Claims, 1 Drawing Sheet

ETCHING CHELATING AGENT, MANUFACTURING METHOD THEREOF, AND ETCHING SOLUTION COMPOSITION

FIELD OF INVENTION

The present application relates to the field of display technology, in particular to an etching chelating agent, a manufacturing method thereof, and an etching solution composition.

BACKGROUND OF INVENTION

In current advanced generation thin-film transistor-liquid crystal display manufacturing process, amorphous silicon thin-film transistors are most commonly used for thin-film transistors. In this type of thin-film transistors, if a resistance of metal trace is too high, an RC-delay effect is likely to occur, which has a greater influence on display effect and thereby affects the display effect of a panel. Because copper material has low resistivity, it can meet wiring requirements of large-size panels. Copper/molybdenum film layer has become a main structure of gate and source-drain metal layers of this type of thin-film transistors, so development of corresponding etching solutions is also particularly important.

Current etching solution for copper-containing film layer is generally a hydrogen peroxide/hydrogen persulfide-based etching solution. In this type of etching solution, as etching progresses, a concentration of copper ions in the etching solution will continue to increase, resulting in an unstable etching process and a risk of boilover explosion, as well as leading to a problem of overly short service life of the etching solution and excessively high production cost. In addition, a large amount of waste liquid treatment expenditure needs to be invested to prevent the excessively high copper ion concentration in the waste liquid from causing pollution to the environment.

Technical Problem

The present application provides an etching chelating agent, which can chelate with copper ions in the etching solution to alleviate a series of undesirable problems caused by excessive concentration of copper ions in the etching solution.

SUMMARY OF INVENTION

To solve the above problem, in a first aspect, the present invention provides an etching chelating agent, the etching chelating agent includes a cellulose cross-linked polymer, the cellulose cross-linked polymer is obtained by cross-linking and polymerizing carboxymethyl cellulose and an amine compound.

In an etching chelating agent provided by an embodiment of the present invention, the amine compound includes an epoxy group.

In an etching chelating agent provided by an embodiment of the present invention, the etching chelating agent further includes porous polystyrene, and the cellulose cross-linked polymer and the porous polystyrene are uniformly bonded to each other.

In an etching chelating agent provided by an embodiment of the present invention, a mass ratio of the cellulose cross-linked polymer to the porous polystyrene is between 5:1 and 3:1.

In another aspect, the present invention also provides a method of manufacturing an etching chelating agent. The method includes: mixing carboxymethyl cellulose with an amine compound and subjecting the carboxymethyl cellulose and the amine compound to a reaction at a first temperature for a first period to obtain a cellulose cross-linked polymer; and adding the cellulose cross-linked polymer, porous polystyrene, a surfactant, and a dispersant to deionized water to form a solution, evenly stirring the solution, and then drying the solution to remove the deionized water to form the etching chelating agent.

In an etching chelating agent provided by an embodiment of the present invention, a molar ratio of the carboxymethyl cellulose to the amine compound is between 5:1 and 1:1.

In a method of manufacturing an etching chelating agent provided by an embodiment of the present invention, the first temperature is between 80° C. and 150° C., and the first period is between 15 minutes and 60 minutes.

In a method of manufacturing an etching chelating agent provided by an embodiment of the present invention, a mass ratio of the cellulose cross-linked polymer to the porous polystyrene is between 5:1 and 3:1.

In a method of manufacturing an etching chelating agent provided by an embodiment of the present invention, the surfactant is polyethylene glycol.

In a method of manufacturing an etching chelating agent provided by an embodiment of the present invention, the dispersant is selected from at least one of amide compounds.

In a method of manufacturing an etching chelating agent provided by an embodiment of the present invention, the amine compound includes an epoxy group.

In another aspect, the present invention also provides an etching solution composition, characterized in that the etching solution composition includes: hydrogen peroxide, an organic acid, an inorganic acid, an etching additive, and an etching chelating agent, wherein the etching chelating agent is a mixture including a cellulose cross-linked polymer and porous polystyrene, and the cellulose cross-linked polymer is obtained by cross-linking and polymerizing carboxymethyl cellulose and an amine compound.

In an etching solution composition provided by an embodiment of the present invention, a mass ratio of the etching chelating agent in the etching solution composition is between 0.5 wt % and 15 wt %.

In an etching solution composition provided by an embodiment of the present invention, a mass ratio of the cellulose cross-linked polymer to the porous polystyrene is between 5:1 and 3:1.

Beneficial Effect

Compared with prior art, the present invention provides an etching chelating agent, including cellulose cross-linked polymer. The cellulose cross-linked polymer is obtained by cross-linking and polymerizing carboxymethyl cellulose and an amine compound substituted with an epoxy group. A great number of carboxyl groups and amine groups are contained in the cross-linked polymer, which can perform strong chelation with copper ions and form precipitate to separate copper ions from the solution. Therefore, when the etching solution containing the etching chelating agent is used to etch the copper-containing film layer, the concentration of copper ions in the etching solution can be effectively suppressed. In one aspect, the stability of the etching process can be maintained, and in the other aspect, the service life of the etching solution can be increased, and the production cost can be reduced.

DESCRIPTION OF DRAWINGS

In order to explain the technical solutions in the embodiments of the present invention more clearly, the drawings in the description of the embodiments will be briefly introduced. Obviously, the drawings in the description are only some embodiments of the present invention. For those skilled in the art, without doing any creative work, other drawings can also be obtained based on these drawings.

DETAILED DESCRIPTION OF PREFERRED EMBODIMENTS

The technical solutions in the embodiments of the present invention will be described clearly and completely with reference to the drawings in the embodiments of the present invention. Obviously, the embodiments are only a part of the embodiments of the present invention, but not all the embodiments. Based on the embodiments of the present invention, all other embodiments obtained by those skilled in the art without making creative efforts fall within the protection scope of the present invention.

In this application, the term "exemplary" is used to mean "used as an example, a case, or an illustration." Any embodiment described as "exemplary" in this application is not necessarily to be construed as more preferred or advantageous than other embodiments. In order to enable any person skilled in the art to implement and use the present invention, the following description is given. In the following description, details are listed for explanatory purposes. It should be understood those of ordinary skill in the art may recognize that the present invention can be implemented without using these specific details. In other embodiments, well-known structures and processes will not be elaborated in detail to avoid unnecessary details that obscure the description of the present invention. Therefore, the present invention is not intended to be limited to the illustrated embodiments but is consistent with the widest scope consistent with the principles and features disclosed in this application.

An embodiment of the present invention provides an etching chelating agent. The etching chelating agent includes a cellulose cross-linked polymer obtained by cross-linking and polymerizing carboxymethyl cellulose and an amine compound.

Wherein the carboxymethyl cellulose is obtained by carboxymethylating cellulose, and the specific steps are as follows:

Step 1: alkalization: [C₆H₇O₂(OH)₃]ₙ+nNaOH→[C₆H₇O₂(OH)₂ONa]ₙ+nH₂O

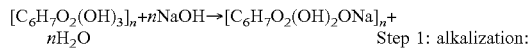

Step 2: etherification: [C₆H₇O₂(OH)₂ONa]ₙ+nClCH₂COONa→[C₆H₇O₂(OH)₂OCH₂COONa]ₙ+nNaCl

Step 3: acidification: [C₆H₇O₂(OH)₂OCH₂COONa]ₙ+nHCl→[C₆H₇O₂(OH)₂OCH₂COOH]ₙ+nNaCl

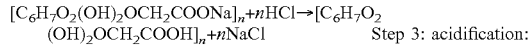

The amine compound is generally an amine compound substituted with an epoxy group, which is usually obtained by a reaction of hydroxylamine compounds and epoxy compounds. Exemplarily, an amine compound containing an epoxy group can be obtained by reacting triethanolamine with epichlorohydrin.

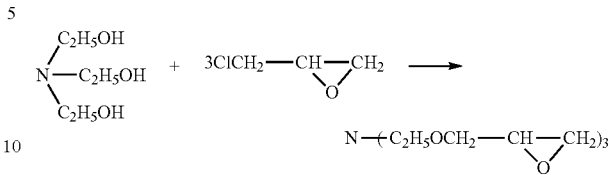

Figure 1:
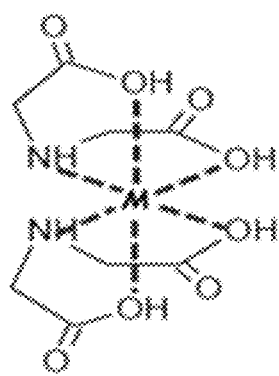
FIG. 1 is a schematic diagram of a chelation mechanism of an etching chelating agent provided by an embodiment of the present invention.

Reacting the amine compound containing epoxy groups with carboxymethyl cellulose. During the reaction, the epoxy group will open and react with the carboxyl group on the carboxymethyl cellulose and connect thereto. Because there are multiple epoxy groups on an amine compound and multiple hydroxyl groups on carboxymethyl cellulose, any two of them are connected in a random way to form a cellulose cross-linked polymer. In the formed cellulose crosslinked polymer, there are more carboxyl groups and amine groups, which can ion-exchange with copper ions and perform strong chelation. The specific principle is shown in FIG. 1. That is, the carboxyl amine group in the cross-linked polymer is combined with the central metal ion M (that is, can be copper ion) through a coordination bond, and a precipitate is formed to separate the copper ion from the solution.

Figure 2:
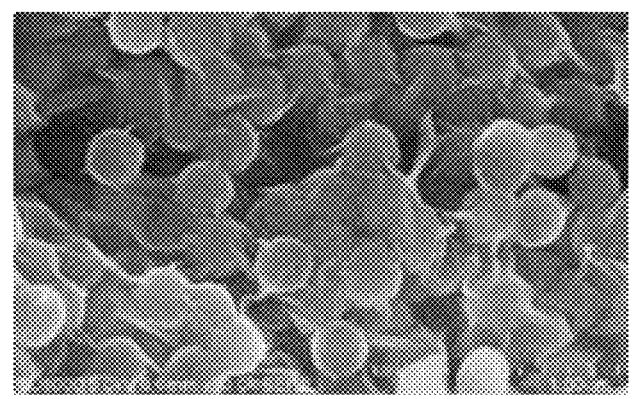
FIG. 2 is a schematic diagram of a micro-morphology of an etching chelating agent provided by an embodiment of the present invention.

In some embodiments, the etching chelating agent further includes porous polystyrene, and the cellulose cross-linked polymer and the porous polystyrene are uniformly bonded to each other, wherein a mass ratio of the cellulose cross-linked polymer to the porous polystyrene is generally 5:1 to 3:1. By adding porous polystyrene, the cellulose cross-linked polymer and the porous polystyrene are uniformly mixed and bonded, which is equivalent to obtaining a cellulose cross-linked polymer with a porous morphology. For the three-dimensional porous morphology of the etching chelating agent, please refer to FIG. 2, that is, the specific surface area of the cellulose cross-linked polymer is increased, thereby improving the efficiency of its chelation with copper ions. It can be understood that the foregoing is to realize the three-dimensional porosity of the cellulose cross-linked polymer by adopting a method of interface self-assembled ordered mesoporous polymer. It can also be realized by a foam impregnation method or a sacrificial template method, which will not be repeated here.

Another embodiment of the present invention also provides a manufacturing method of an etching chelating agent. The manufacturing method includes: mixing the carboxymethyl cellulose with the amine compound and subjecting them to a reaction at a first temperature for a first period to obtain a cellulose cross-linked polymer; and adding the cellulose cross-linked polymer, porous polystyrene, a surfactant, and a dispersant to deionized water to form a solution, evenly stirring the solution, and then drying the solution to remove the deionized water to form the etching chelating agent.

In some embodiments, the amine compound is an amine compound substituted with an epoxy group.

In some embodiments, a molar ratio of the carboxymethyl cellulose to the amine compound is between 5:1 and 1:1.

In some embodiments, the first temperature is between 80° C. and 150° C., and the first period is between 15 minutes and 60 minutes.

In some embodiments, a mass ratio of the cellulose cross-linked polymer to the porous polystyrene is between 5:1 and 3:1.

In some embodiments, the surfactant is polyethylene glycol, the dispersant is selected from at least one of amide compounds, such as polyimide.

Another embodiment of the present invention also provides an etchant composition. The etching solution composition includes: hydrogen peroxide, an organic acid, an inorganic acid, an etching additive, and an etching chelating agent, wherein the etching chelating agent is a mixture including a cellulose cross-linked polymer and porous polystyrene, and the cellulose cross-linked polymer is obtained by cross-linking and polymerizing carboxymethyl cellulose and an amine compound.

The etching solution composition is generally used for wet etching of a copper film layer and a copper-containing film layer. As the etching progresses, the copper ions in the etching solution will continue to increase. However, due to the addition of an etching chelating agent, the cellulose cross-linked polymer contains more carboxyl groups and amine groups, and can perform strong chelation with copper ions, and forms a precipitate to separate copper ions from the etching solution. Therefore, the rapid increase of the copper ion concentration in the etching solution can be effectively suppressed. In one aspect, the stability of the etching process can be maintained, in the other aspect, the service life of the etching solution can be increased, and the production cost can be reduced.

It can be understood that, in addition to the above-mentioned composition, the etching solution composition can also contain other compositions as needed, which is not limited in the present invention.

In some embodiments, in the etching solution composition, the content of the etching chelating agent is between 0.5 wt % and 15 wt %. It can be understood that the amount of the etching chelating agent added is proportional to the concentration of copper ions in the etching solution composition. At an initial stage of the life of the etching solution, the copper ion concentration is low, and only a small amount of etching chelating agent needs to be added at this time. As the etching continues, the concentration of copper ions in the etching solution also increases, and the added content of the etching chelating agent increases accordingly.

The etching chelating agent, manufacturing method thereof, and the etching solution composition provided by the embodiments of the present invention have been described in detail above. In this article, specific examples are used to explain the principles and implementations of the present invention. The descriptions of the examples are only used to help understand the method and core ideas of the present invention. In addition, for those skilled in the art, according to the idea of the present invention, there can be changes in the specific implementation and application scope. As described above, the content of this specification should not be construed as limiting the present invention.

What is claimed is:

1. An etching chelating agent, comprising a cellulose cross-linked polymer, wherein the cellulose cross-linked polymer is obtained by cross-linking and polymerizing carboxymethyl cellulose and an amine compounds; wherein the amine compound comprises an epoxy group.

2. The etching chelating agent according to claim 1, wherein the etching chelating agent further comprises porous polystyrene, and the cellulose cross-linked polymer and the porous polystyrene are uniformly bonded to each other.

3. The etching chelating agent according to claim 2, wherein a mass ratio of the cellulose cross-linked polymer to the porous polystyrene is between 5:1 and 3:1.

4. A manufacturing method of an etching chelating agent, comprising:
mixing carboxymethyl cellulose with an amine compound and subjecting the carboxymethyl cellulose and the amine compound to a reaction at a first temperature for a first period to obtain a cellulose cross-linked polymer; and
adding the cellulose cross-linked polymer, porous polystyrene, a surfactant, and a dispersant to deionized water to form a solution, evenly stirring the solution, and then drying the solution to remove the deionized water to form the etching chelating agent.

5. The method of manufacturing the etching chelating agent according to claim 4, wherein a molar ratio of the carboxymethyl cellulose to the amine compound is between 5:1 and 1:1.

6. The method of manufacturing the etching chelating agent according to claim 4, wherein the first temperature is between 80° C. and 150° C., and the first period is between 15 minutes and 60 minutes.

7. The method of manufacturing the etching chelating agent according to claim 4, wherein a mass ratio of the cellulose cross-linked polymer to the porous polystyrene is between 5:1 and 3:1.

8. The method of manufacturing the etching chelating agent according to claim 4, wherein the surfactant is polyethylene glycol.

9. The method of manufacturing the etching chelating agent according to claim 4, wherein the dispersant is selected from at least one of amide compounds.

10. The method of manufacturing the etching chelating agent according to claim 4, wherein the amine compound comprises an epoxy group.

11. An etching solution composition, comprising:
hydrogen peroxide, an organic acid, an inorganic acid, an etching additive, and an etching chelating agent, wherein the etching chelating agent is a mixture comprising a cellulose cross-linked polymer and porous polystyrene, and the cellulose cross-linked polymer is obtained by cross-linking and polymerizing carboxymethyl cellulose and an amine compound.

12. The etching solution composition according to claim 11, wherein a mass ratio of the etching chelating agent in the etching solution composition is between 0.5 wt % and 15 wt %.

13. The etching solution composition according to claim 11, wherein a mass ratio of the cellulose cross-linked polymer to the porous polystyrene is between 5:1 and 3:1.

* * * * *